US007969312B2

(12) United States Patent
Abrunhosa

(10) Patent No.: US 7,969,312 B2
(45) Date of Patent: Jun. 28, 2011

(54) DEVICE AND PROCESS FOR MAGNETIC MATERIAL DETECTION IN ELECTRONIC ARTICLE SURVEILLANCE (EAS) ELECTROMAGNETIC SYSTEMS

(76) Inventor: Jorge José Gouveia Abrunhosa, Nova Friburgo (BR)

( * ) Notice: Subject to any disclaimer, the term of this patent is extended or adjusted under 35 U.S.C. 154(b) by 379 days.

(21) Appl. No.: 12/281,873

(22) PCT Filed: Mar. 6, 2007

(86) PCT No.: PCT/BR2007/000061
§ 371 (c)(1),
(2), (4) Date: Dec. 3, 2008

(87) PCT Pub. No.: WO2007/101317
PCT Pub. Date: Sep. 13, 2007

(65) Prior Publication Data
US 2009/0102662 A1    Apr. 23, 2009

(30) Foreign Application Priority Data

Mar. 7, 2006  (BR) .................................. 0605714

(51) Int. Cl.
*G08B 13/14* (2006.01)
*G08B 13/24* (2006.01)
*G08B 13/18* (2006.01)

(52) U.S. Cl. ............... 340/572.2; 340/572.1; 340/572.6; 340/551; 340/552

(58) Field of Classification Search .... 340/572.1–572.9, 340/551–552
See application file for complete search history.

(56) References Cited

U.S. PATENT DOCUMENTS

| 3,983,552 | A | | 9/1976 | Bakeman, Jr. et al. |
| 4,539,558 | A | * | 9/1985 | Fearon ....................... 340/572.2 |
| 5,414,410 | A | * | 5/1995 | Davies et al. ................. 340/551 |
| 5,748,086 | A | * | 5/1998 | Bettine et al. ............. 340/572.4 |
| 6,909,368 | B2 | * | 6/2005 | Sumi et al. .................... 340/551 |
| 7,075,427 | B1 | * | 7/2006 | Pace et al. ................ 340/539.22 |
| 2002/0158764 | A1 | * | 10/2002 | Conway ..................... 340/573.3 |
| 2003/0210145 | A1 | * | 11/2003 | Manov et al. ............... 340/572.4 |
| 2005/0151535 | A1 | * | 7/2005 | Hagino et al. ............. 324/207.2 |
| 2006/0003730 | A1 | * | 1/2006 | Elder et al. .................... 455/333 |
| 2006/0143899 | A1 | * | 7/2006 | Tuttle et al. ..................... 29/600 |
| 2007/0046334 | A1 | * | 3/2007 | Hairapetian ................... 326/86 |
| 2010/0001872 | A1 | * | 1/2010 | Lian et al. ..................... 340/661 |

FOREIGN PATENT DOCUMENTS

EP   1 416 300 A2   5/2004
WO   WO 90/03623 A1   4/1990

* cited by examiner

*Primary Examiner* — Daniel Wu
*Assistant Examiner* — Kam Ma
(74) *Attorney, Agent, or Firm* — Alston & Bird LLP

(57) ABSTRACT

The present invention relates to a device with its related electronic circuit and to a detection process targeted to detect any magnetic material moving around the antennas/sensors used in Electronic Article Surveillance (EAS) electromagnetic systems, which can be internally or externally coupled to these kind of anti-theft systems, significantly decreasing its current vulnerability to fraud since the current EAS electromagnetic systems are vulnerable for not being able to detect magnetic materials. The present process and detector device filter and treat the DC signal generated by the displacement of a magnetic material around one or more EAS electromagnetic system antenna/sensor(s). Magnetic material detection is achieved from a differential signal existing in the antenna/sensor receiver, such signal being forwarded to a control unit wherein there are coupled a device comprising a "n" order filter, a buffer, a sensitivity control circuit, a control logic and an alarm module.

10 Claims, 2 Drawing Sheets

DEVICE AND PROCESS FOR MAGNETIC MATERIAL DETECTION IN ELECTRONIC ARTICLE SURVEILLANCE (EAS) ELECTROMAGNETIC SYSTEMS

CROSS-REFERENCE TO RELATED APPLICATIONS

This application is a continuation of PCT Application No. PCT/BR2007/000061 filed on 6 Mar. 2007, which claims the priority to Brazil patent document PI0605714-4, filed 7 Mar. 2006.

FIELD OF THE INVENTION

The present invention relates to a device and a process for the detection of any magnetic material moving around the antennas/sensors used in Electronic Article Surveillance (EAS) electromagnetic systems. Said device can be internally or externally coupled to these systems, offering an additional security level, significantly decreasing its current vulnerability to fraud.

BRIEF DESCRIPTION OF THE PRIOR ART

The current EAS electromagnetic systems present great vulnerability because they have been developed decades ago for protecting articles against theft. So, it is natural to find methods and procedures developed to circumvent them.

A method for circumventing these systems is publicly known, based on the use of magnetic materials, such as the small magnets commonly used in loud speakers and electronic products in general. The security tags, strips, tapes, locks, markers, responsive targets or any other name given to similar security devices, attached, for example, to clothes, CDs and books, are usually made from high magnetic permeability metallic alloy surrounding or overlapped to a ferromagnetic material and so it can be magnetized to allow its deactivation/activation when necessary, for using as an integrated part of the EAS electromagnetic system antennas/sensors.

When those magnets approach the security tags or similar security devices attached to the articles to be protected, the ferromagnetic material inside the security tags becomes magnetized and so the security tags are deactivated and become passive to the EAS electromagnetic system antennas/sensors.

The prior art offers some knowledge, related to EAS electromagnetic systems and metal detectors, as can be verified from documents BR 9101430-1, referring to a sensor, to an article surveillance system, to the sensor manufacturing process and to the process for detecting the existence of a sensor interrogation area; BR 9306561-2, referring to a process and an apparatus to control the composite signal flow to signal processing circuits as well as to detect the presence of a target in an interrogation area in security systems; BR 9403475-3, describing a process for manufacturing a deactivatable marker for an EAS system, among others, all of them having and describing anti-theft systems, their component parts and manufacturing methods, however without any concern about suppressing its vulnerability to fraud by means of magnetic materials.

Another prior-art document, BR 9903669-0, describes a process to integrate a metal detector into a security system. In that document, similar to all the other ones, there is no mention to the integration of a magnetic material detector into an EAS electromagnetic system and/or to its component parts (i.e. antennas/sensors, security tags and activation/deactivation accessories), since said document describes a process to integrate metal detectors into a security system, coupling to that system conventional devices, such as an electromagnetic metal inductance detector, an X-ray and/or a capacitive detector, video cameras and/or photograph machines, allowing to identify, by recording, people carrying metal parts. It is important to mention that a metal detector is not exactly a magnetic material detector, since not every metal is magnetic or has magnetic properties.

When analyzing document U.S. Pat. No. 4,527,152, it can be noted that the inventors were concerned with describing in details an EAS electromagnetic system, presenting, for example, in FIG. 2, indicated with reference 8, a deactivatable security tag, and mentioning in FIG. 3, with reference 46, a deactivating device. Actually, it is not mentioned that such as the deactivating device enables the deactivation of the security tag, a magnetic material could equally deactivate the tag. In addition, the inventors did not present a solution to avoid the already mentioned vulnerability to fraud by means of magnetic materials.

OBJECTS OF THE INVENTION

It is an object of the invention to solve the described problems by means of a specific magnetic material detector internally or externally coupled to the existing EAS electromagnetic system.

This way, in case of external coupling, the magnetic material detector (i.e. magnet detector) is installed outside the EAS electromagnetic system, being capable of detecting the security tags or similar security devices attached to library and store articles, for example, presenting a gateway shape similar to the regular metal detectors used in airports and banks, externally coupled to the EAS electromagnetic system antennas/sensors.

In case of internal coupling, another object of the invention allows the convergence in a single apparatus of both a magnetic material detector device (e.g. magnet detector) and an EAS electromagnetic system, capable of detecting security tags or any similar security devices attached to library and store articles, for example.

A further object of the invention achieved when using internal coupling is to decrease the manufacturing costs by assembling the magnetic material detector device in a single apparatus, instead of manufacturing separately a magnetic material detector having a gateway shape similar to the regular metal detectors used in airports and banks and an EAS electromagnetic system, further contemplating other additional objects, such as the simplification of the installation, operation, maintenance procedures, being also aesthetically advantageous.

SUMMARY OF THE INVENTION

The conventional EAS electromagnetic systems are able to operate with a single antenna/sensor, but the security tag detection is not enough. Usually two or more antennas/sensors are employed to obtain an area with a satisfactory security tag detection. In addition to the antennas/sensors, a control unit and similar security devices are used, such as security tags and locks, and accessories for their deactivation/reactivation.

Considering the publicly known and previously described methods to circumvent the system, and that the object of the invention is to definitively solve this existing problem in the current EAS electromagnetic systems, the present invention was developed to achieve magnetic material detection, in order to prevent any magnetic material from entering premises protected by an EAS electromagnetic system, when passing through its antennas/sensors. The differential of the present magnetic material detector device is that it can be internally or externally coupled to EAS electromagnetic systems.

The proposed solution is based upon the principle that when a magnetic material approaches the antenna/sensor, the differential signal existing in the antenna/sensor receiver element will present a new component, which is usually not treated and not used in the filtering process of the current EAS electromagnetic systems.

Basically, the disturbance generated by the magnetic material is different from the disturbance generated by the security tag or similar security devices, because the magnetic material presents a DC field that overlaps the AC field used for security tag detection.

In short, when passing through the space or area existing between the antennas/sensors, the magnetic material generates a disturbing DC current and, when displaced, it also causes a very low frequency amplitude modulation on said differential signal. Hence, the AC component present in the differential signal will also incorporate a DC component, which will be appropriately filtered and processed in order to detect the magnetic material being displaced.

DETAILED DESCRIPTION OF THE DRAWINGS

The device described herein can be easily understood by means of the following detailed description of the drawings.

Figure 1:
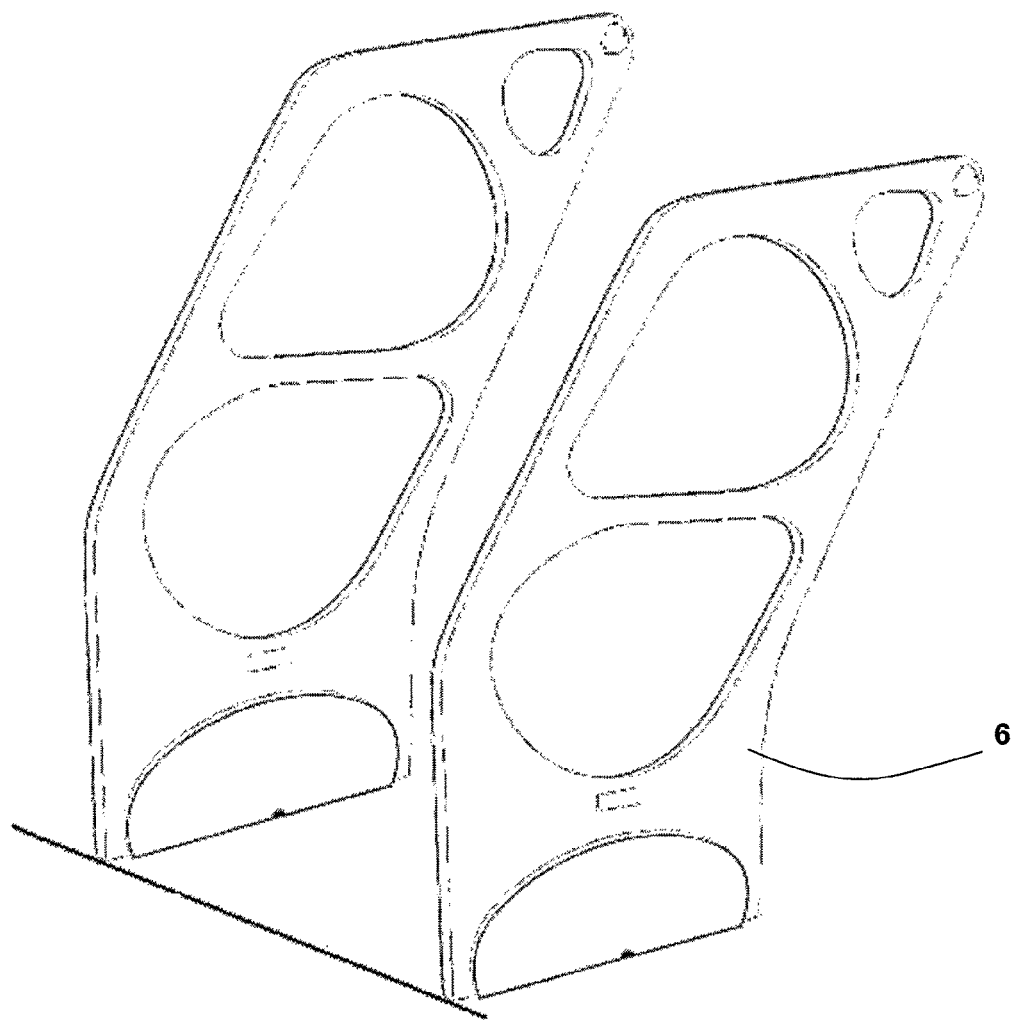
FIG. 1 is a perspective view of the EAS electromagnetic system antennas/sensors used to protect premises, including the magnetic material device internally coupled to the antennas/sensors.

As shown in FIG. 1, the antennas/sensors 6 can be placed individually in pairs or in multiple configurations at the entries and/or exits of premises, with the purpose of detecting any article passing through it without previous authorization or approval. The present invention uses the physical structure of the original antennas/sensors, incorporating into its architecture a magnetic material detector device, thus preventing the passage of any kind of magnetic material that could be used to deactivate the security tags or similar security devices, turning off the EAS electromagnetic system. It is important to emphasize that the magnetic material detector device described herein, as shown in FIG. 1, is internally coupled to the antenna/sensor; however, it can be externally, or even remotely, coupled to said antenna/sensor. This means that the present invention also allows to use the magnetic material detector device assembled inside additional antennas, presenting a gateway shape similar to the regular metal detectors used in airports and banks.

Figure 2A:
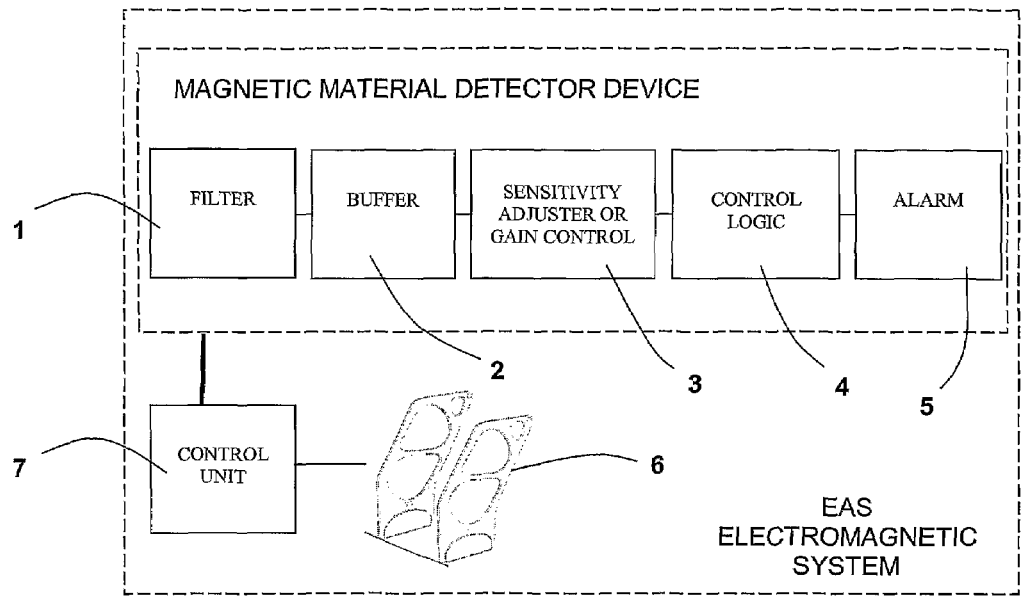
FIG. 2A is a schematic view of the component elements related to the EAS electromagnetic system and the magnetic material detector device of the present invention, where the magnetic material detector device is internally coupled to the EAS electromagnetic system.
Figure 2B:
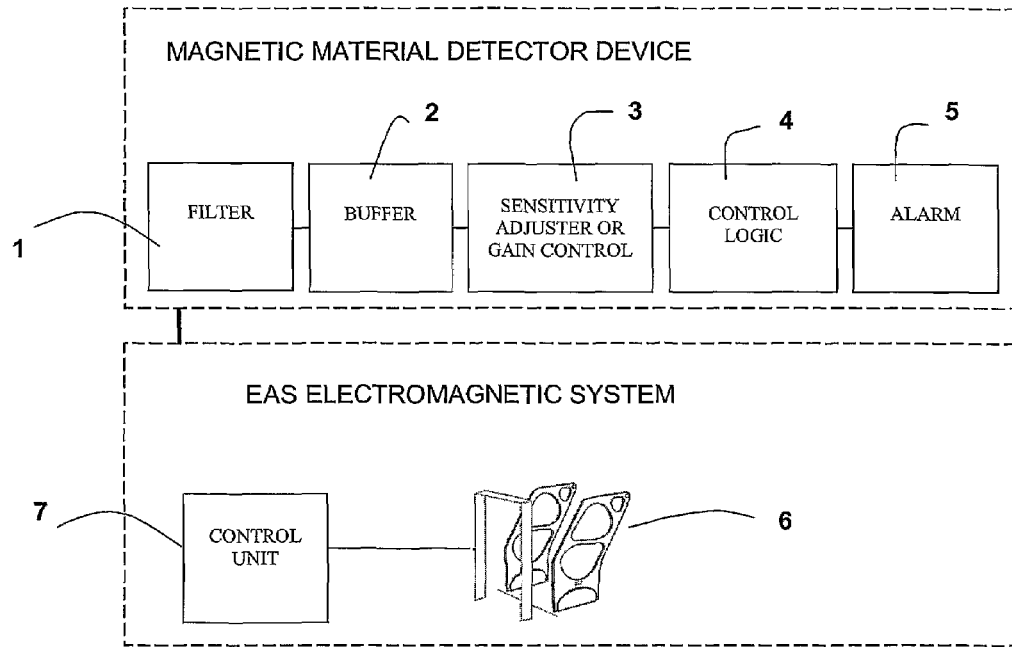
FIG. 2B is a schematic view of the component elements related to the EAS electromagnetic system and the magnetic material detector device of the present invention, where the magnetic material detector device is externally coupled to the EAS electromagnetic system, using or not its own antennas/sensors.

FIGS. 2A and 2B offer schematic views of the proposed solution in this application and present a simplified device made according the present invention. While FIG. 2A depicts a magnetic material detector device internally coupled to the conventional EAS electromagnetic system, FIG. 2B shows the same operational characteristic, where the magnetic material detector device is externally coupled to said conventional EAS electromagnetic system, using or not the same EAS electromagnetic system antennas/sensors 6, as described in the last paragraph, allowing to use additional pairs of antennas/sensors 6.

The differential signal coming from the antennas/sensors 6 receiver elements is forwarded by any appropriate means to the control unit 7. In the control unit 7, a device is coupled generating, from an "n" order filter 1 (the filter order depends on the manufacturer of the control unit 7), an analog signal presenting both AC and DC component information. This signal is sent to a buffer or high impedance insulator circuit 2, starting the DC signal specific treatment, originated from the displacement of the magnetic material, without overloading the next stages that will treat the AC signal. That procedure is essential to avoid losses in the security tag or similar security devices detection, during the operation of the new device resulting from the present invention, ensuring total compatibility with the current EAS electromagnetic systems.

The sensitivity adjuster or gain control circuit 3 allows to adjust the magnetic material detection sensitivity as well as to equalize the response to the signal level coming from the "n" order filter 1, since its level varies as a direct function of the "n" order filter 1 response, the magnetic material mass (volume) or surface (area), the magnetic material composition (i.e. ferrites, rare earths), the environment electromagnetic noise, the influence of metallic masses as well as the antennas/sensors 6 impedance.

The output of the sensitivity adjuster or gain control circuit 3 presents an analog signal that is connected to control logic 4, in charge of its digital filtering.

The control logic 4 output is connected to the alarm module 5, which, in case of a magnetic material detection event, turns on an audible alarm, additionally generates a visible alarm and also the remote actuation of electric locks, turnstiles, voice synthesizers, among other electromechanical and electronic devices.

The device resulting from the present invention is totally insensitive to the presence of security tags, that is, it does not detect them. Also, this device presents very low power consumption, so it is possible to use the same power supplies available at the control unit 7, without causing overload problems to the existing power sources.

As mentioned before, the sensitivity detection of the present invention varies depending on some parameters, such as the "n" order filter 1 response, the magnetic material mass (volume) or surface (area), the magnetic material composition (i.e. ferrites, rare earths), the environment electromagnetic noise, the influence of metallic masses as well as the antennas/sensors 6 impedance. However, it can be noted that the devices presented schematically in FIGS. 2A and 2B are able to detect, in an efficient way, magnetic material independently from large variations of the parameters mentioned herein.

Therefore, it can be understood that the object of the present invention and its component parts described herein are part of some of the preferred embodiments and of examples related to situations that could take place, the actual scope of the invention being defined by the claims.

The invention claimed is:

1. A device for magnetic material detection coupled to an Electronic Article Surveillance (EAS) electromagnetic system, the system being comprised of:
- at least one antenna/sensor (6) for detecting EAS tags different from the magnetic material and generating a differential signal responsive to an EAS tag; and
- a control unit (7);

characterized in that the device comprises:
- an "n" order filter (1) wherein n is an integer,
- a buffer or a high impedance insulator circuit (2),
- a sensitivity adjuster or gain control circuit (3),
- a control logic (4), and
- an alarm module (5),
- wherein the filter (1), the buffer (2), the sensitivity adjuster or gain control circuit (3), the control logic (4) and the alarm module (5) are compatibly internally or externally coupled to the EAS electromagnetic system;
- the control unit (7) receives a differential signal detected from the antenna/sensor (6) representative of the EAS tag and the magnetic material, and internally or externally forwards it to the "n" order filter (1);
- the output of the "n" order filter (1) is a signal presenting both AC and DC component information, this signal is sent to the buffer or high impedance insulator circuit (2), which buffers the previous stages to avoid harm in the EAS tag detection and filters out the DC component, which DC component is then processed by the sensitivity adjuster or gain control circuit (3) and given to the control logic (4) for digital filtering; and
- the control logic (4) output from the digital filtering is connected to the alarm module (5) for generating an alarm when said magnetic material is detected.

2. A device according to claim 1, characterized in that the EAS electromagnetic system comprises two antennas/sensors.

3. A device according to claim 1, characterized in that the EAS electromagnetic system comprises four antennas/sensors forming two pairs, the first of the pairs employed as the EAS electromagnetic system proper, and the other used to detect magnetic materials, regardless of the position of these two pairs.

4. A device according to claim 1, characterized in that the sensitivity adjuster or gain control circuit (3) adjusts the magnetic material detection as well as equalizes its response to the signal level from the "n" order filter (1).

5. A device according to claim 4, characterized in that the sensitivity adjusted by the sensitivity adjuster or gain control circuit (3) varies in function of the "n" order filter (1) response, the magnetic material mass or surface, the magnetic material composition, the environment electromagnetic noise, the influence of metallic masses as well as the antennas/sensors (6) impedance.

6. A device according to claim 1, characterized in that the alarm module (5), in case of a magnetic material detection event, turns on electromechanical, audible, visible and/or electronic devices, all from the group of audible alarms, visible alarms, remote actuation of electric locks, turnstiles, and voice synthesizers.

7. A process for magnetic material detection by a device coupled to an EAS electromagnetic systems, wherein when a magnetic material approaches antennas/sensors (6) of said EAS electromagnetic system, a differential signal resulting in an antennas/sensors (6) receiver element connected to the antennas/sensors (6) presents a new component as a result of the magnetic material displacement through the space existing between the antennas/sensors (6), characterized by further comprising the steps of:
- obtaining a disturbing DC field from the differential signal existing in the antennas/sensors receiver element of the EAS electromagnetic system, wherein said disturbing DC field overlaps an AC field resulted from presence of an EAS tag that is used for EAS tag detection, and the DC field is generated when said magnetic material passes through the space or area existing between the antennas/sensors of the EAS electromagnetic system, and wherein when displaced, the magnetic material also causes a very low frequency amplitude modulation on said differential signal; and
- filtering and processing said disturbing DC field, wherein the magnetic material is detected when said disturbing DC field is present in said differential signal.

8. A process according to claim 7, characterized in that the magnetic material detection occurs simultaneously with EAS tag detection.

9. A process according to claim 7, characterized in that the magnetic material detection occurs during the displacement of said magnetic material.

10. A process according to claim 7, wherein the device is coupled to the EAS electromagnetic system either internally or externally, characterized in that the magnetic material detection occurs in one pair of antennas/sensors (6) of the EAS electromagnetic system, in case of internal coupling; and the magnetic material detection occurs in another pair of antennas/sensors (6) used only for magnetic material detection, in case of external coupling, regardless of the position of these two pairs.

* * * * *